Jan. 5, 1943.   N. L. ETTEN   2,307,368
WRINGER ROLL STOP
Filed Aug. 27, 1940   2 Sheets-Sheet 2
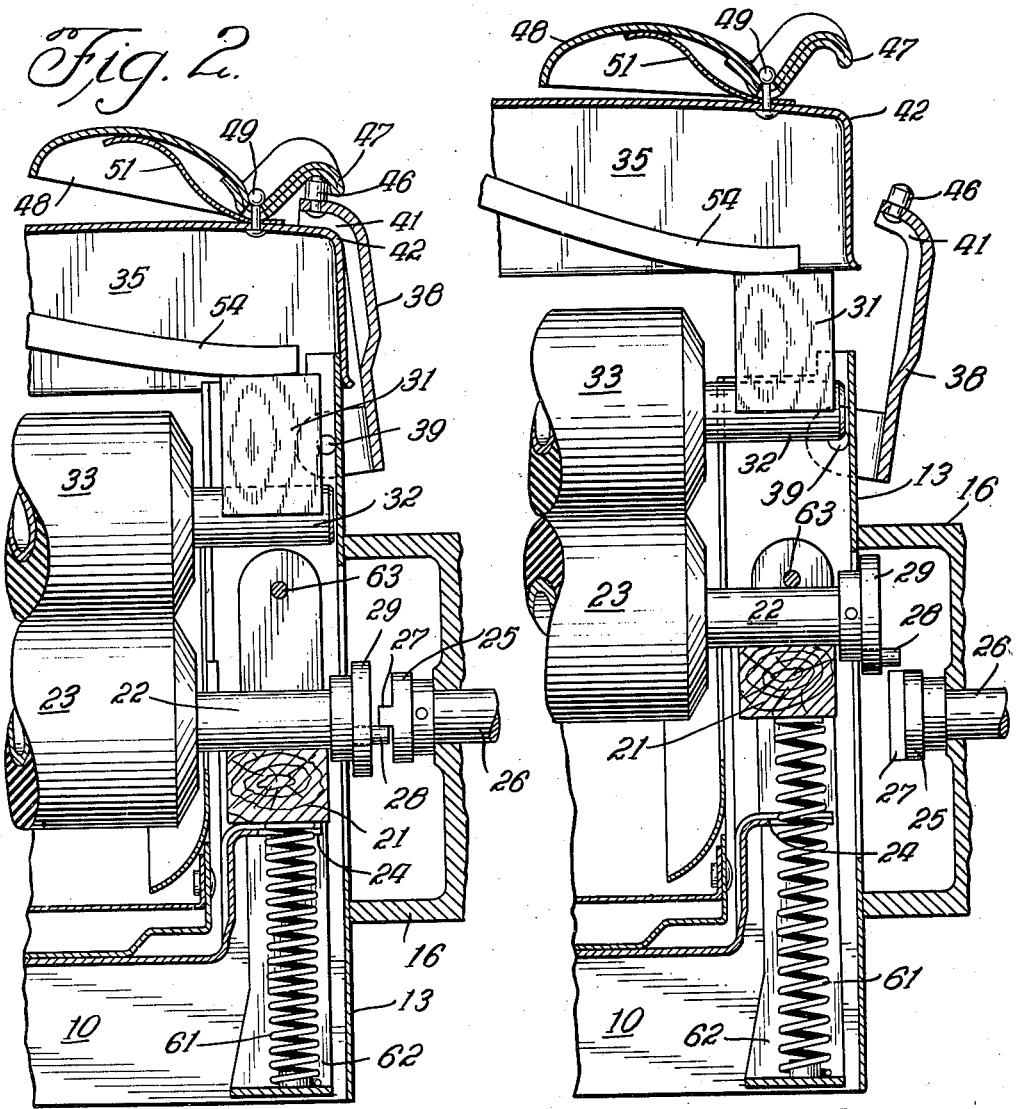
Fig. 2.
Fig. 3.
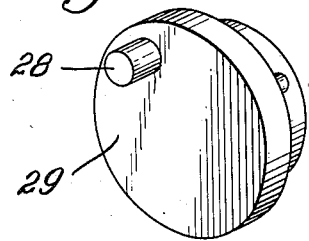
Fig. 4.
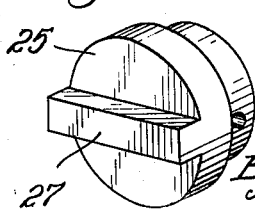
Fig. 5.
Inventor:
Nicholas L. Etten
By Tefft & Tefft
Att'ys.

Patented Jan. 5, 1943

2,307,368

UNITED STATES PATENT OFFICE 2,307,368

WRINGER ROLL STOP

Nicholas L. Etten, Waterloo, Iowa

Application August 27, 1940, Serial No. 354,414

5 Claims. (Cl. 68—253)

This invention relates to wringer mechanisms, and particularly to a means for automatically disengaging the driving connection to a pair of wringer rolls in response to the operation of the usual emergency pressure release.

Most domestic wringers on the market today include a pair of power driven rolls urged into engagement with each other by means of a pressure spring and are provided with an emergency release whereby this pressure may be instantly released. It is recognized in the art that in order to provide the maximum degree of safety to the operator it is not only necessary that the spring pressure be released, but it is also necessary that the power driving connection to the rolls be instantly disengaged in order that the rolls may stop revolving.

This result is not difficult to accomplish, but the necessity for an extremely simple and rugged construction capable of withstanding neglect and abuse, coupled with the highly competitive nature of the manufacturing industry combine to create a demand for such a mechanism of a simpler and more dependable nature than those heretofore developed.

In the prior art it has been customary to provide roll stop mechanisms consisting of gears or clutches actuated by mechanism including slides, racks, pivots or similar devices. These structures have not been entirely without merit, but so far as known to the applicant, they have been subject to very serious limitations in that their inherent mechanical design was of such nature as to require some considerable degree of precision of manufacture and assembly. In mechanical circles it is understood that the necessity of maintaining close tolerances during manufacture of any mechanical item is to be avoided insofar as it is possible to do so in order to accomplish economical production. This is of great importance in the domestic appliance field, because of the highly competitive nature of the industry, but in the case of wringer mechanisms, it has been found that an even greater objection to the use of mechanisms including closely fitted parts arises from the fact that the ordinary wringer is operated under extremely adverse conditions, and the cumulative effects of years of corrosion or rusting of the mechanical parts in addition to the constant accumulation of dirt, fabric strands, soap, residues and other foreign matter may seriously affect the operation of the device or even render it entirely inoperative.

It is, therefore, a primary object of this invention to provide a new and improved roll stop mechanism for domestic wringers.

Another object is to provide a wringer having a laterally movable idler roll and a normally stationary driven roll with means whereby the normally stationary roll may move a limited amount in the direction of the idler roll at the time of pressure release, and means responsive to this limited movement for disengaging the driving connection to the rolls.

A further object of the invention is to provide a roll stop mechanism comprising a clutch consisting of a driving shaft and driven shaft in substantial alignment and operatively connected by a transverse bar associated with one shaft and adapted to engage a crank pin associated with the other shaft.

A further object of the invention is to provide a roll stop clutch mechanism of a novel, simple and rugged construction, well adapted to economical methods of manufacture and characterized by the absence of gears, cones, slides, pivots, or other closely fitted mechanisms requiring precision manufacturing methods or close tolerances in assembly or alignment of parts.

Referring now more particularly to the drawings:

Fig. 2 is a fragmental longitudinal sectional view through one of the vertical bearing slides showing the method of mounting and driving the wringer rolls;

Fig. 3 is a sectional view similar to Fig. 2, but having the several parts in released position;

Fig. 4 is a perspective view of the driven element of the roll-stop clutch; and

Fig. 5 is a perspective view of the driving element of the clutch.

Figure 1:
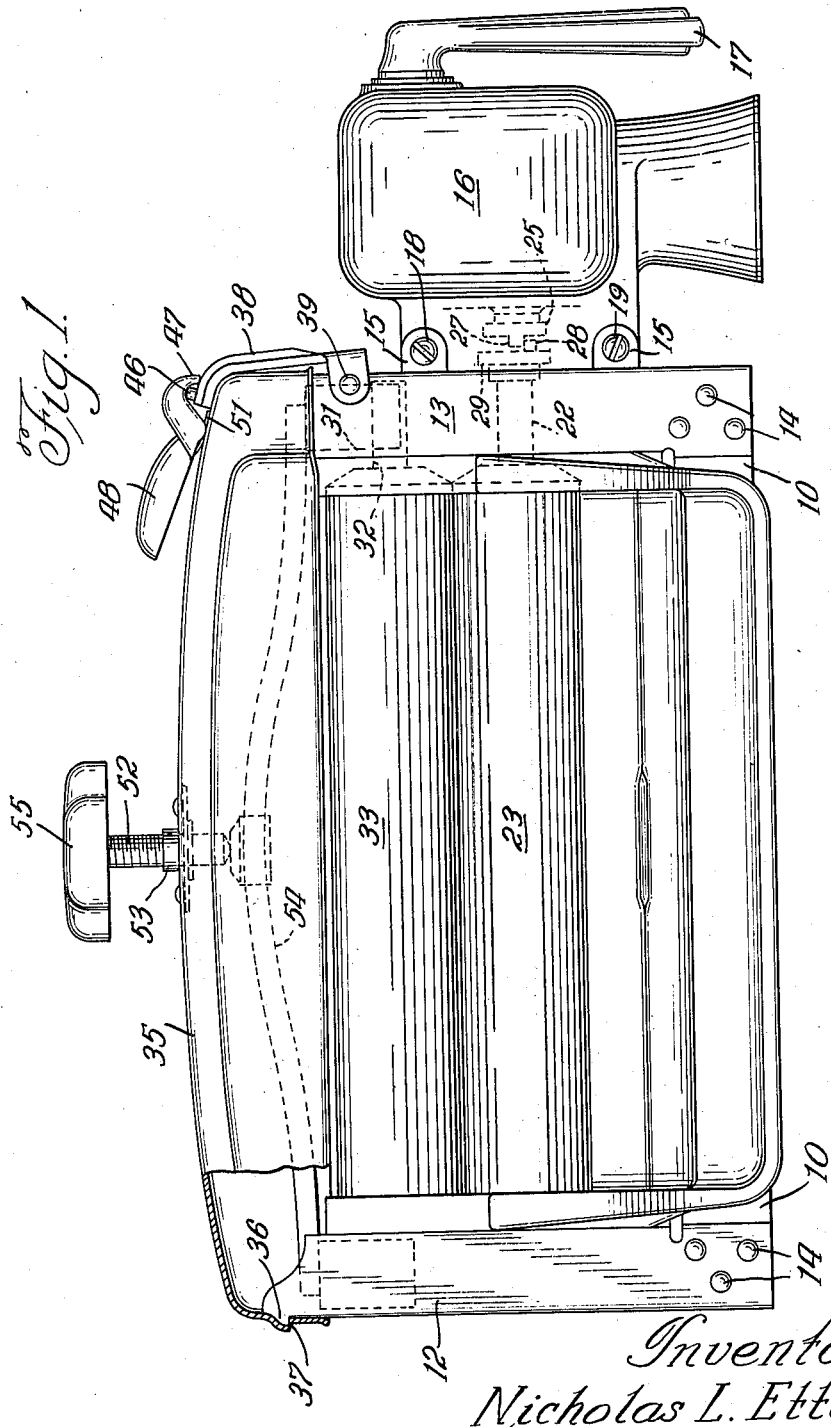
Fig. 1 is a side elevation of a wringer constructed in accordance with the principles of this invention.

The frame of the wringer is preferably constructed with a longitudinally extending bottom channel 10 at each end of which a vertically extending bearing slide 12 and 13 is secured, as, for example, by means of rivets 14 or by spot welding. The bearing slide 13 is provided with a mounting bracket 15 by means of which the entire wringer structure is secured to a power head 16, containing the usual reversing gears operated by means of the control handle 17. This mounting bracket may be secured to the bearing slide 13 in any desirable way or may be formed as an integral part thereof, but is preferably secured to the power head 16 by means of the machine screws 18 and 19.

The bearing slides 12 and 13 are substantially channel shaped in cross section and are provided with a pair of lower roll bearings 21, in which the shaft 22 of a lower wringer roll 23 is journaled. These lower wringer roll bearings 21 are loosely mounted within the bearing slides 12 and 13, but are limited in their downward movement within these slides by stop members 24 which in the present instance are formed on either end of the longitudinally extending bottom channel 10.

A driving clutch element comprising a disc 25 is pinned to the drive shaft 26 extending from the power head 16, and this disc 25 includes an integral transverse bar portion 27, adapted to engage a crank pin 28 carried on the disc 29 pinned to the roll shaft 22.

A pair of upper wringer roll bearings 31 are loosely mounted within the bearing slides 12 and 13 and carry the roll shaft 32 of an upper wringer roll 33. A top housing 35 extends between the bearing slide 12 and the bearing slide 13, being secured to the bearing slide 12 by means of a projection 36 which is formed on the bearing slide 12 and which is adapted to engage a perforation 37 formed on the top housing 35. This top housing 35 is secured to the bearing slide 13 by means of a manually releasable latch mechanism. This latch mechanism comprises a hook portion 38 which is pivotally mounted upon the bearing slide 13 by means of a rivet 39 and which includes an upper curved portion 41 so shaped as to engage the upper corner 42 of the top housing 35. A latch stud 46 is carried by this hook portion 38 and is normally engaged by a latch 47 formed as an extension to a manually operable release handle 48 which is pivotally mounted upon the pin 49 secured to the top housing 35 and which is normally urged in a clockwise direction (as viewed in the drawings) by means of a leaf spring 51.

A tension adjusting screw 52 is threaded into a boss 53 secured to the upper surface of the top housing 35 and this screw extends downwardly within the housing 35 in order to contact a pressure spring 54 which rests upon and extends between the pair of upper roll bearings 31. The adjusting screw 52 is provided with a hand wheel 55 such that it may be turned down in order to force the pressure spring 54 downwardly against the upper roll bearing 31 in such a manner as to force the upper roll 33 into resilient engagement with the lower roll 23.

An initial pressure having been established between the roll 23 and 33, the machine is ready for operation, since at this time the latch mechanism associated with the top housing 35 will act to maintain the top housing 35 in the position illustrated in Fig. 2. It will be appreciated that the leaf spring 51 prevents the latch 47 from disengaging from the latch stud 46 and that since the curved portion 41 of the hook 38 cannot move outwardly to disengage the corner 42 of the top housing 35, this top housing 35 will be secured against any upward movement.

In the event that it is necessary to operate the emergency release mechanism, the operator may manually strike the release handle 48, thus releasing the latch 47, allowing the hook 38 to disengage the top housing 35 and therefore allowing this top housing 35 to be thrown upwardly by the force exerted by the pressure spring 54. As hereinbefore pointed out, it is desirable at this time to not only release the pressure relationship existing between the rolls, but also to disengage the driving connection to these rolls and to thus stop their rotation.

This is accomplished instantaneously by the operation of the driving clutch element 25 on the driven clutch element 29. It will be understood that as long as the lower wringer roll 23 is under operating pressure, the lower bearing 21 will be forced into firm, stationary relationship with the stop member 24, so that as the clutch element or disc 25 revolves, one surface of the transverse bar 27 will bear against the crank pin 28 affixed to the driven clutch disc 29 and impart rotary movement to the rolls.

As the pressure is released, however, the force exerted by the bar 27 will force the pin upwardly above the path of movement of the bar to disengage the driving connection to the rolls and stop their rotation. This operation is entirely positive irrespective of the direction of rotation of the rolls, since it operates under the power of the drive shaft 26 independently of any auxiliary springs, but inasmuch as it is desirable to maintain the rolls in completely disengaged position, it is desirable to provide means to support the weight of the rolls and prevent any "clicking" between the clutch elements due to the continuing rotation of the disc 25.

To this end a coil spring 61 may be mounted under the lower roll bearing 21 housed within the bearing slide 13 in such a manner as to tend to move this bearing 21 upwardly. The lower end of this spring 61 may be mounted in any desirable manner, it having been found convenient to provide a U-shaped spring mounting bracket 62, which extends upwardly along the inner walls of the bearing slide 13 to a point slightly above the roll shaft 22 where it is secured by means of a cross rivet 63.

The wringer rolls may be reset by unscrewing the adjusting screw 52 and reengaging the emergency release mechanism after which the adjusting screw 52 is again turned down in order to move the pressure spring 54 downwardly and apply the proper initial pressure between the rolls 33 and 23. When this is done, it will be obvious that the relatively great pressure exerted by the spring 54 will readily overcome the light upward pressure exerted by the coil spring 61 and the lower roll bearing 21 will, therefore, be again moved downwardly into positive engagement with the stop 24. At this time the bar 27 on the disc 25 will reengage the crank pin 28 on the disc 29, and the wringer will again be ready for operation.

From the foregoing it will be seen that this construction provides a simple and rugged roll stop mechanism having certain inherent advantages not found in the prior art, as follows:

1. The structure disclosed provides a range of manufacturing tolerances hitherto unknown in any comparable mechanism. It is to be noted, first, that the clutch elements themselves need not be accurately machined on any surfaces whatsoever and are of such design as to operate with entire satisfaction even when formed of relatively soft and inexpensive die casting alloys. Secondly, it is to be noted a large amount of end-play of the wringer shaft is unobjectionable and that comparatively great angular misalignment between the drive shaft and roll shaft will cause no difficulty or binding by virtue of the "single point" contact between the driving and driven elements. Further, tests have shown that the clutch assembly will operate satisfactorily even when the centers of the driving and driven shafts are not concentric.

2. The clutch construction is entirely open on all sides and the "single point" contact between the driving and driven elements provides no surfaces upon which dirt or other foreign matter can accumulate. Each time the wringer pressure is released or the rotation of the rolls reversed, the relative movement between the parts will "wipe" the contacting surfaces and remove all foreign matter by the sliding movement of the pin 28 across the face of the projection 27.

3. The present structure provides a self-actuated disengaging mechanism not dependent on springs, and of an open construction which may be reengaged without critical registry of clutch or gear teeth.

While I have shown and described the present preferred embodiment of this invention, it is subject to numerous modifications without departing from the invention spirit and I, therefore, do not wish to be limited except as by the scope of the appended claims.

I claim:

1. In a wringer including a frame, a pressure spring, and a pair of pressure rolls rotatably mounted in the frame and each consisting of a roll shaft and a resilient roll surface the combination of a roll drive assembly including a driving unit consisting of a power drive shaft, a fixed bearing for said drive shaft, and a drive disc solidly affixed to the end of said drive shaft and including a straight transverse bar on the face of the disc, and a driven unit consisting of a driven disc solidly affixed to the roll shaft of one of the aforesaid rolls, said driven disc including a crank pin at right angles to the driven disc surface and engaging said bar and in eccentric relationship with the roll shaft; a bearing for the wringer roll shaft intermediate said driven disc and the resilient surface portion of the roll, a bearing support positioned with respect to the drive shaft to locate the driving unit and driven unit in approximately concentric relationship, and a spring to urge the roll shaft bearing, roll shaft, and driven unit away from concentric position with respect to the driving unit.

2. In a wringer including a frame, a pressure spring, and a pair of pressure rolls rotatably mounted in the frame and each consisting of a roll shaft and a resilient roll surface, the combination of a roll drive assembly including a driving unit consisting of a power drive shaft, a fixed bearing for said drive shaft, and a drive disc solidly affixed to the end of said drive shaft and including a projection on the face of the disc, and a driven unit consisting of a driven disc solidly affixed to the roll shaft of one of the aforesaid rolls, and including a projection on the face of the driven disc adapted to be engaged by said first named projection; a bearing for the wringer roll shaft intermediate said driven disc and the resilient surface portion of the roll, a bearing support positioned with respect to the drive shaft to locate the driving unit and driven unit in approximately concentric relationship, and a spring to urge the roll shaft bearing, roll shaft, and driven unit away from concentric position with respect to the driving unit.

3. In a wringer including a frame, a pressure spring, and a pair of pressure rolls rotatably mounted in the frame and each consisting of a roll shaft and a resilient roll surface, roll pressure lock and release means, the combination of a roll drive assembly including a driving unit consisting of a power drive shaft, and a drive disc solidly affixed to the end of said drive shaft and including a projection on the face of the drive disc, and a driven unit consisting of a driven disc normally concentric with said drive disc solidly affixed to the roll shaft of one of the aforesaid rolls, and including a projection on the face of the driven disc in eccentric relationship with the roll shaft and engaging the projection on the drive disc, the arrangement permitting vertical separation of the discs and projections, and vertically acting spring means for causing said vertical separation when roll pressure is released.

4. In a wringer including a frame, a pressure spring, and a pair of pressure rolls rotatably mounted in the frame and each consisting of a roll shaft and a resilient roll surface, roll pressure lock and release means, the combination of a roll drive assembly including a driving unit consisting of a power drive shaft with a drive disc thereon, and including a double-faced transverse bar on the face of the drive disc, and a driven unit consisting of a driven disc normally concentric with said drive disc solidly affixed to the roll shaft of one of the aforesaid rolls, said driven disc including a crank pin at right angles to the disc surface and engaging said bar and in eccentric relationship with the roll shaft, the arrangement permitting vertical separation of the discs and projections, and vertically acting spring means for causing said vertical separation when roll pressure is released.

5. In a wringer including a frame, a pair of co-operative pressure rolls, pressure means for urging the rolls into pressure engagement with each other, roll pressure setting and release means, drive means for driving one of the rolls, including a fixed center rotating radial drive bar engaging a rotatable vertically separable eccentric driven pin for rotating the driven roll, the axes of rotation of said bar and pin normally coinciding and spring means for causing such vertical separation of the driving means when roll pressure is released.

NICHOLAS L. ETTEN.